United States Patent [19]

Fortune

[11] 4,178,496
[45] Dec. 11, 1979

[54] DESOLDERING ATTACHMENT FOR SOLDERING INSTRUMENT

[76] Inventor: William S. Fortune, 14250 Dearborn St., Panorama City, Calif. 91402

[21] Appl. No.: 835,670

[22] Filed: Sep. 22, 1977

[51] Int. Cl.² .............................................. B23K 3/00
[52] U.S. Cl. ...................................... 219/230; 15/344; 219/238; 228/20; 228/55
[58] Field of Search ............... 219/227, 229, 230, 236, 219/238, 239; 228/51-55, 19, 20, 191, 264; 15/344

[56] References Cited

U.S. PATENT DOCUMENTS

| | | | |
|---|---|---|---|
| 1,619,817 | 3/1927 | Gibson | 219/230 UX |
| 3,211,354 | 10/1965 | Dugard et al. | 228/20 |
| 3,883,716 | 5/1975 | Fortune | 219/241 |
| 3,970,234 | 7/1976 | Litt et al. | 219/230 UX |

FOREIGN PATENT DOCUMENTS

| | | | |
|---|---|---|---|
| 2009865 | 9/1971 | Fed. Rep. of Germany | 219/230 |
| 2440005 | 2/1975 | Fed. Rep. of Germany | 219/230 |
| 181042 | 6/1922 | United Kingdom | 219/230 |

*Primary Examiner*—A. Bartis
*Attorney, Agent, or Firm*—Daniel T. Anderson

[57] ABSTRACT

A desoldering attachment for a soldering instrument which may be the temperature controlled type disclosed and claimed in Applicant's prior U.S. Pat. No. 3,883,716. The desoldering attachment comprises an adjustable, inclined desoldering tip which is hollow for the application of a vacuum. It also includes a sleeve housing a filter screen and baffle device for preventing the solder from entering the remainder of the instrument. Extending through the sleeve is a heater element sleeve which contains a heating element for heating the desoldering tip. The heater element sleeve screws into the head of the desoldering tip until it meets a portion of the desoldering tip which can then be adjusted so that the vacuum pipe and the tip of the instrument are properly aligned with respect to the soldering instrument.

10 Claims, 7 Drawing Figures

DESOLDERING ATTACHMENT FOR SOLDERING INSTRUMENT

BACKGROUND OF THE INVENTION

This invention relates generally to a desoldering tool and particularly relates to a desoldering attachment for a soldering instrument.

Such desoldering tools are known in the art and have also been referred to in Applicant's prior U.S. Pat. No. 3,883,716 above referred to. Such a desoldering attachment may include a vacuum pipe which must be precisely aligned with the soldering instrument, the latter being preferably of the type disclosed and claimed in Applicant's prior patent above referred to. The desoldering tool may feature a vacuum hose and a trigger button for applying at will the vacuum to the desoldering tool by means of a supply hose. Hence, the vacuum pipe must be aligned with the trigger button of the soldering instrument.

Additionally, the desoldering attachment has a hollow tip which is inclined with respect to the longitudinal axis of the tool. Hence, the tip must be properly positioned in a downward direction and must be lined up both with the vacuum pipe and the soldering instrument.

In the past the adjustment of the position of the desoldering tip was by means of washers which could be added at will to space the desoldering tip from the desoldering tool. This is obviously a time-consuming and impractical adjustment.

It is accordingly an object of the present invention to provide an improved desoldering attachment for a soldering instrument.

A further object of the present invention is to provide such a desoldering tool where the soldering tip, as well as the vacuum pipe, can be readily adjusted with respect to the soldering instrument.

Another object of the present invention is to provide an attachment of the type discussed which features a simplified construction and ease of manufacture.

Still a further object of the invention is to provide an improved solder baffle device for the instrument which may readily be manufactured and which is easy to clean.

SUMMARY OF THE INVENTION

A desoldering attachment in accordance with the present invention includes a sleeve or housing provided with a vacuum pipe for attachment to a vacuum system. The soldering instrument is provided with a trigger button for applying at will a vacuum. A heater element sleeve extends from the soldering instrument. One end of the housing sleeve is closed by a rear end cap having a plurality of projecting legs or columns for spacing a filter screen. The filter screen is followed by a solder baffle device which serves the purpose to prevent solder from entering the remainder of the instrument. The heater element sleeve extends through the rear cap and housing sleeve and is provided with external threads meshing with a knurled nut or cap. The heater element sleeve may also be provided with an external nut adjacent the threads.

The heater tip is slidably disposed in a head and points off center. The head is provided with internal threads meshing with external threads on the heater element sleeve. Hence the rotational position of the head is adjustable with respect to the vacuum pipe and housing sleeve and serves, by means of an internal set screw, as an adjustable stop for the heater element sleeve. The knurled nut then locks the entire assembly.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
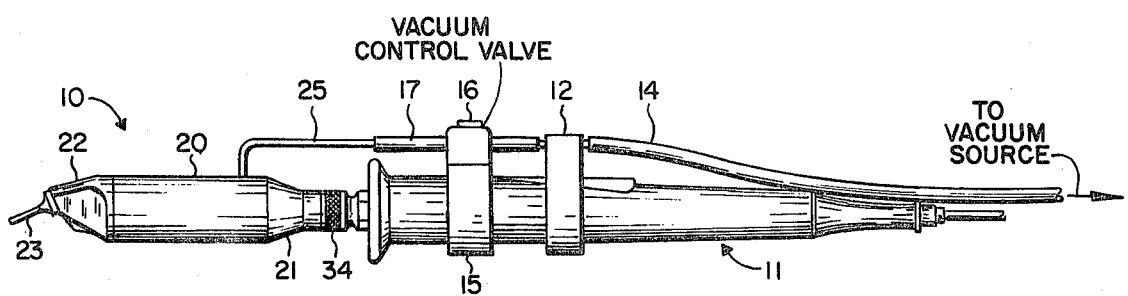
FIG. 1 is a side elevational view of a soldering instrument bearing an example of the desoldering attachment of the invention and connected thereto.

Referring now to the drawings and particularly to FIGS. 1-6, there is illustrated an example of the desoldering attachment 10 of the present invention. As shown in FIG. 1, there is a soldering instrument generally designated 11 which, as indicated before, may be the one disclosed and claimed in Applicant's prior patent. The soldering instrument 11 has an elongated housing about which is disposed a hose adaptor clip 12 for a supply vacuum hose 14. Spaced from the hose adaptor clip 12 is a trigger assembly 15 including a trigger button 16. The trigger assembly includes a hollow housing through which extends a vacuum hose 17. By depressing the trigger button 16 the vacuum line may be opened to apply vacuum to the desoldering tool 10. It will, of course, be understood that the supply vacuum hose 14 is connected to a suitable source of vacuum.

The desoldering tool 10 generally includes a sleeve or housing 20, a rear end cap 21, a desoldering head 22 and a desoldering tip 23 which is hollow for applying a vacuum thereto. A vacuum pipe 25, rigid, in this example, is secured to and extends from the housing sleeve 10. Its main portion is parallel to the housing sleeve 20, while it has a tip 26 extending through the sleeve into its interior. As clearly shown in FIG. 1, the vacuum pipe 25 connects to the vacuum hose 17 of the soldering instrument.

Extending from the soldering instrument 11 is a hollow heater element sleeve 28. The heater sleeve 28 carries a heating element 30 near its externally threaded outer end 31. The heater sleeve 28 may also be provided with an external nut 32, shown here as hexagonal, made integral therewith to facilitate a rotational grip thereon. Adjacent the nut 32 external threads 33 are provided in the surface of the sleeve 28 which mesh with the internal threads of a knurled retaining nut or collar 34. The rear end cap 21 may consist of a heat resistant plastic and is provided in this example, with a plurality of stand-off legs or columns 35. The rear end cap 21 is of generally conical construction and has a reduced diameter, forward end cylindrical portion 36 forming a retaining shoulder into which fits the housing sleeve 20. The end cap 21 also has a reduced diameter cylindrical rear end portion 37 forming another retaining shoulder onto which fits the outer end of the retaining collar or nut 34. The rear bore or inner opening 38 of the end cap 21 is formed such that it will receive the heater sleeve 28.

A filter screen 39 fits within the housing 20 and over the heater sleeve 28 and bears axially between the stand-off legs 35 and a solder baffle ring disposed forwardly thereof and generally shown at 40. The baffle ring has a shank portion 41 provided with vents to permit the flow of air and some solder particles to pass therethrough. It is followed by a portion 42, L-shaped in longitudinal section, which bears against the filter screen 40. Thus the baffle ring supports the filter screen and aids in blocking the solder particles, particularly the larger ones which might otherwise unduly choke or fill the screen.

The head 22 has a rearwardly extending cylindrical portion 44 provided with internal threads 45 for receiving and engaging the external threads of the heater sleeve 28. It also is provided with an offset portion 47 which houses the desoldering tip 23 so that the common axis of both forms an angle with the longitudinal axis of the housing sleeve 20. To this end the portion 47 is provided with a cylindrical inner opening 48 within which the desoldering tip is retained with freedom for axial adjustment. The tip 23 itself has a reduced diameter central portion 50 defined axially by two enlarged diameter cylindrical portions 51 and 52. Hence, the shoulder 53 defined between the enlarged portion 52 and the reduced portion 50 serves to limit the motion of the tip. The stop itself is formed by a set screw 54 which is threaded into a retaining engagement therewith by way of a threaded bore in an inclined portion 55 of the head 22. The tip 23 is hollow, as indicated, to permit the application of a vacuum and has a rear portion 56 of much reduced diameter which slides in an opening 57 in the head 22. Functionally, then, the actual desoldering tip 60 extends from the head 22 and provides air flow communication from its extreme forward end to the solder collector chamber within the housing 20.

Figure 2:
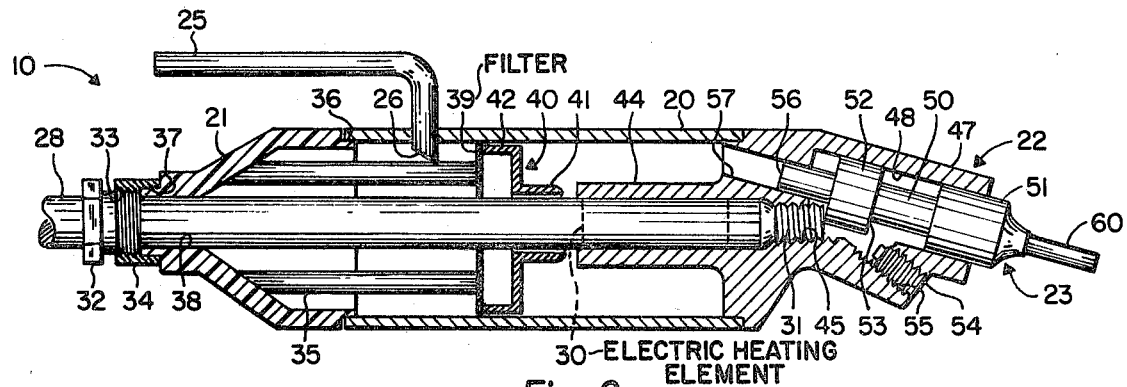
FIG. 2 is a longitudinal sectional view on enlarged scale of the desoldering attachment with the cooperating heater element sleeve.

The attachment as shown particularly in FIG. 2, is assembled in the following manner. The retaining collar 34 is screwed all the way rearwardly over the threads 33 of the heating sleeve 28. Subsequently, the rear end cap 21 is inserted over the heating sleeve 28 so that its reduced diameter portion 37 fits into the collar 34. Next the housing sleeve 20 is inserted over the end cap 21 and its cylindrical, retaining shoulder recess 36 making sure that the vacuum pipe tip 26 slides between the legs 35. Then the filter screen 39 followed by the solder baffle ring 40, is dropped over the heating element sleeve 28 into the housing sleeve 20. Care should be taken that vacuum pipe 25 is properly aligned with the trigger button 16 and the vacuum hose 17 of the soldering instrument. Next the head 22 is inserted into the sleeve 20 and is screwed by engagement of threads 31, 45, over the heating element sleeve 28 in a clockwise direction, as viewed in FIG. 3, until it is stopped by the engagement therewith of enlarged portion 52 of the desoldering tip 23. The tip 60 should now be in the position shown in FIG. 3, that is, it should point downwardly while the vacuum pipe 25 and trigger 16 point upwardly.

Figure 3:
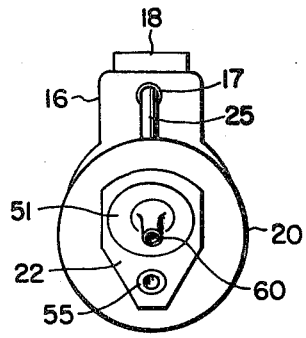
FIG. 3 is a front elevational view of the desoldering tip and instrument in a normal or desired position.
Figure 4:
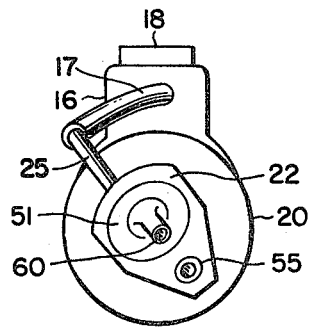
FIG. 4 is a view similar to that of FIG. 3 but showing the desoldering tip rotated in a counter clockwise direction from the normal position.

However, if the head is not in the proper position shown in FIG. 3 but, for example, in the position of FIG. 4, the head must be adjusted. In such case the head 22 has been stopped too soon by the heater sleeve 28 abutting the enlarged portion 52 of the tip 23. In order to effect the necessary adjustment, the set screw 54 is threadingly moved outwardly in its recess 55, to its position as shown in FIG. 2, which permits the tip 23 to move further outwardly of the head 22. The head 23 can then be rotated further in a clockwise direction over the heater sleeve 28 until it reaches the desired angular position of FIG. 3.

Figure 5:
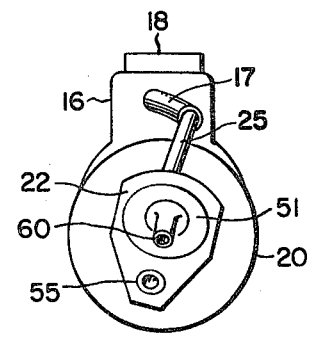
FIG. 5 is a view similar to that of FIGS. 3 and 4 but showing the desoldering tip rotated in a clockwise direction from the normal position.
Figure 6:
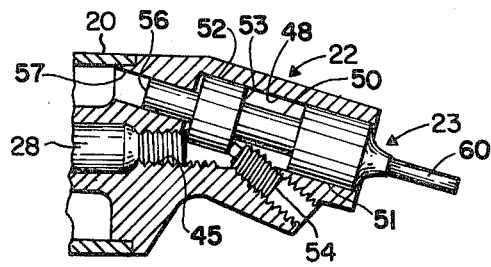
FIG. 6 is a partial sectional view similar to that of FIG. 2 but illustrating the desoldering tip in a different position to serve as a stop for the heater element sleeve.

In an alternate example, when the tip is in the position shown in FIG. 5, it is rotated too far in a clockwise direction, as viewed in that figure; and the heater sleeve 28 has moved too far rearwardly and must be backed up again. In this case, the set screw 54 should be tightened so that the head 22 is permitted to rotate less far into the threads of the heater sleeve 28. The adjustment necessary in this example is illustrated in FIG. 6. Here the set screw 54 is moved further inwardly hence pushing the tip 23 to the left or more inwardly into the head 22. This will stop the heater sleeve 28 earlier thereby to force the desoldering tip 60 to stop in the proper position.

When finally the instrument is properly aligned it can now be locked by rotating the knurled collar 34 forwardly against the rear end cap 21.

It should be noted that the vacuum pipe 25, the housing sleeve 20, the head 22 and the heater sleeve 28 are made of metal and preferably consist of stainless steel. Of course, the tip 23 and the heater sleeve 28 should consist of a material which is relatively heat conductive and may be stainless steel. The end cap 21 may consist of a material which is heat resistant and thermally stable such, for example, as formica or phenolic.

Another feature of the present invention is that the heater sleeve 28 with its forward portion 31 is in heat conductive contact with the desoldering tip 23, that is, specifically, with its enlarged cylindrical portion 52. This will, of course, promote a rapid heating of the tip 60 of the desoldering tool. This is further promoted by the fact that the heating element 30 is disposed as close as possible to the forward end 31 of the heater sleeve 28.

In operation, when the solder to be removed has been heated properly, the trigger 16 of the trigger assembly is pressed, thereby to apply a vacuum impulse to the tip 60. The solder is then drawn through the tip 60 into the solder collector interior of the sleeve 20 and is caught by the solder baffle ring 42 and, eventually, the filter screen 34.

The desoldering tip 23 fits fairly snugly into its retaining bore 48 of the head 22, thereby minimizing the loss of the vacuum. This also minimizes solder getting into the recesses of the head 22 rather than into the collector chamber of the housing 20.

The entire desoldering attachment may be rapidly cleaned and the solder removed in the following manner. First the vacuum hose 17 is removed. Then the forward end of the tip 60 is inserted into a suitable vacuum desoldering instrument which in turn draws out the solder through the tip 60. This is preferably effected while the attachment is still hot.

Eventually the attachment may have to be opened and the solder baffle ring 42 and filter screen 39 removed and cleaned.

Figure 7:
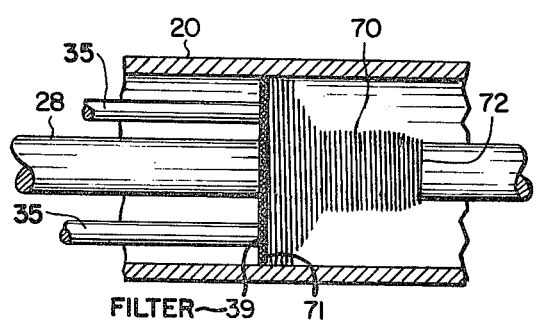
FIG. 7 is a side elevational view of a coil spring surrounding the heater element sleeve and disposed in the housing sleeve of the attachment and serving as an alternative and preferred solder baffle element.

FIG. 7 to which reference is now made, shows an improved solder baffle device 70. This consists of a coil spring tightly wound from a suitable metallic wire, and of generally conical shape. It is made in such a fashion that it is slightly spaced from the heater sleeve 28 but fits fairly tightly upon the inner surface of the housing sleeve 20. The baffle device 70 is inserted in such a manner that the large diameter, rearward portion 71 faces the filter screen 39, and the reduced diameter, forward portion 72 faces the desoldering tip 23. Hence, any solder particles drawn rearwardly into the collector chamber are deflected outwardly toward the housing sleeve 20 and are there collected and retained.

It is to be noted that normal variations in the winding of the coil spring 70 cause gaps to form between adjacent windings. These gaps are small enough to prevent most solder particles from passing through. On the other hand, they are large enough to permit adequately free passage of the air from the tip 60 to the vacuum source.

This solder baffle 70 may most readily be cleaned by expanding it axially, whereby the solder simply drops off. It is particularly inexpensive and easy to make, while at the same time being rugged, reliable, and non critical in its composition. It will be understood that the coil spring 70 does not have to be exactly conical; the surface of the coil spring may form some other type curve as long as it has a right-hand end 72 as shown in FIG. 7 which is relatively narrow and a left-hand end 71 which fits relatively tightly into the sleeve 20.

There has thus been described a desoldering attachment for a soldering tool which achieves the objects and exhibits the advantages set forth hereinabove. The attachment is characterized by the ease of adjustment of the position of the desoldering tip. It also features a simplified construction. In addition, a new baffle for the solder has been shown which is particularly easy to manufacture and exceedingly easy to clean.

What is claimed is:

1. The combination of a desoldering attachment and a soldering instrument, said combination comprising:
   (a) a soldering instrument of the type including a handle having a heater sleeve extending forwardly therefrom;
   (b) an electric heater element disposed in said heater sleeve, and said heater sleeve having an outwardly threaded forward end portion adjacent said heating element, and having external locking collar engaging threads spaced rearwardly therefrom;
   (c) a housing sleeve surrounding said heater sleeve in spaced relation thereto and defining a solder receiving chamber surrounding said heater sleeve;
   (d) a vacuum tube extending outwardly from the interior of said housing sleeve for communicating said chamber with a source of vacuum;
   (e) an end cap engaging said heater sleeve and said housing sleeve for closing the rear end of said housing sleeve and having an opening for permitting the forward end of said heater sleeve to extend therethrough into said housing sleeve;
   (f) a filter screen in said housing sleeve;
   (g) means on said end cap for spacing said filter screen within said housing sleeve forwardly of said vacuum tube;
   (h) a vented solder baffle means disposed in said housing sleeve and adapted to rest against the front of said filter screen;
   (i) a head portion engaging said housing sleeve and said heater sleeve for closing the front end of said housing sleeve and having internal threads receiving the external threads on said heater sleeve;
   (j) a hollow desoldering tip supported for movement back and forth axially within said head portion and communicating with the interior of said housing sleeve forwardly of said baffle means, said tip extending off center with respect to the longitudinal axis of said heater sleeve, a portion of said tip being engageable by the forward end of said heater sleeve and acting as a stop to limit the extent to which the forward end of said heater sleeve can be threaded into the threads of said head portion, the extent to which the heater sleeve can be threaded into the head portion determining the angular position of the tip with respect to the vacuum tube, and
   (k) adjustable locking means extending through said head portion into engagement with said tip for adjustably limiting the axial motion of said tip within said head portion, the angular position of said tip with respect to said vacuum tube being adjustable by adjusting the axial position of said tip within said head portion by said locking means.

2. An adaptor as defined in claim 1, wherein a locking collar having internal threads is provided meshing with the locking collar engaging threads of said heater sleeve for locking said collar against said heater sleeve.

3. An adaptor as defined in claim 1, wherein said solder baffle means consists of a vented ring bearing against said filter screen for catching solder particles.

4. An adaptor as defined in claim 1, wherein said solder baffle means consists of a wound coil spring having one reduced diameter portion surrounding said heater sleeve and another enlarged diameter portion engageable with said housing sleeve.

5. An adaptor as defined in claim 4, wherein said spring is of conical shape.

6. An adaptor as defined in claim 1, wherein said locking means for adjusting the angular position of said desoldering tip is a set screw threaded into said head portion.

7. An adaptor as defined in claim 6, wherein said desoldering tip has two enlarged diameter cylindrical end portions interconnected by a reduced cylindrical portion defining a shoulder on one end portion of said tip to form a stop engageable by said set screw.

8. An adaptor as defined in claim 1, wherein said desoldering tip consists of a highly conductive material, whereby a heat transfer path is formed from the end portion of said heater sleeve to said desoldering tip.

9. The combination of a desoldering adaptor and a soldering instrument, said combination comprising:
   (a) a soldering instrument including a handle having a heater sleeve extending forwardly therefrom, said heater sleeve enclosing an electric heater and having an externally threaded front end portion and having further external locking collar engaging threads spaced rearwardly therefrom;
   (b) an internally threaded locking collar on said heater sleeve adapted to cooperate with the further threads of said heater sleeve;

(c) a hollow housing spaced from and surrounding said heater sleeve and forming a solder receiving chamber;

(d) a vacuum tube extending from the interior of said housing for communicating the interior of said housing with a source of vacuum;

(e) the rear of said housing being provided with an end cap for closing the rear of said housing, said end cap having a rear portion being engaged by said collar, said end cap having a plurality of spacer elements;

(f) a filter screen supported in said housing by said spacer elements and fitting about said heater sleeve forwardly of said vacuum tube;

(g) a vented solder baffle element disposed forwardly of said filter screen;

(h) said housing including a front head portion closing off the front of said housing, said head portion having an internal threaded end portion for cooperation with the external threads of said heater sleeve;

(i) a hollow desoldering tip supported for movement axially back and forth in said head portion and communicating with solder receiving chamber forwardly of said baffle element;

(j) said tip extending off center with respect to the longitudinal axis of said heater sleeve, a portion of said tip being engageable by the forward end of said heater sleeve and acting as a stop to limit the extent to which the forward end of said heater sleeve can be threaded into the threads of said head portion, the extent to which the heater sleeve can be threaded into the head portion determining the angular position of the tip with respect to the vacuum tube, adjustable locking means associated with said head portion and engageable with said tip for adjustably limiting the axial motion of said tip within said head portion, whereby the angular position of said tip with respect to said vacuum tube can be adjusted by the adjustment of the axial position of said tip within said head portion by said locking means, and said locking collar being capable of locking said end cap against said heater sleeve and hence locking the adjusted attachment.

10. The adaptor as defined in claim 9, wherein said solder baffle element consists of a tightly wound coil spring having an enlarged portion adjacent said filter screen.

* * * * *